(12) United States Patent
Schock et al.

(10) Patent No.: US 8,768,797 B2
(45) Date of Patent: Jul. 1, 2014

(54) SYSTEMS, METHODS AND COMPUTER PROGRAM PRODUCTS THAT FACILITATE MATCHING OF DEBTOR PAYMENTS TO COLLECTION AUTHORITY ACCOUNTS

(71) Applicant: Portfolio Recovery Associates, Inc., Norfolk, VA (US)

(72) Inventors: Sheila Schock, Algonquin, IL (US); Casey Daise, Chesapeake, VA (US); Suraj Joshi, Virginia Beach, VA (US); Dave Mellott, Virginia Beach, VA (US); John Moshier, Moyock, NC (US); Chris Rictor, Virginia Beach, VA (US); Alireza N. Sanatdoust, Virginia Beach, VA (US)

(73) Assignee: Portfolio Recovery Associates, Inc., Norfolk, VA (US)

( * ) Notice: Subject to any disclaimer, the term of this patent is extended or adjusted under 35 U.S.C. 154(b) by 95 days.

(21) Appl. No.: 13/680,799

(22) Filed: Nov. 19, 2012

(65) Prior Publication Data

US 2014/0143101 A1   May 22, 2014

(51) Int. Cl.
*G07F 19/00*   (2006.01)

(52) U.S. Cl.
USPC .......................................................... 705/30

(58) Field of Classification Search
None
See application file for complete search history.

(56) References Cited

U.S. PATENT DOCUMENTS

| | | | | |
|---|---|---|---|---|
| 5,991,733 | A * | 11/1999 | Aleia et al. | 705/7.13 |
| 2006/0167793 | A1 * | 7/2006 | Sachs | 705/40 |
| 2007/0043659 | A1 * | 2/2007 | Kass et al. | 705/38 |
| 2007/0043661 | A1 * | 2/2007 | Kass et al. | 705/38 |
| 2007/0067236 | A1 * | 3/2007 | Deinhardt et al. | 705/39 |
| 2008/0215392 | A1 * | 9/2008 | Rajan | 705/7 |
| 2010/0161459 | A1 * | 6/2010 | Kass et al. | 705/30 |
| 2013/0041807 | A1 * | 2/2013 | Singh | 705/38 |
| 2013/0144781 | A1 * | 6/2013 | Evans | 705/40 |
| 2013/0159164 | A1 * | 6/2013 | Kassir | 705/38 |
| 2014/0012737 | A1 * | 1/2014 | Evans | 705/38 |

* cited by examiner

*Primary Examiner* — Mussa A Shaawat
(74) *Attorney, Agent, or Firm* — Myers Bigel Sibley & Sajovec, P.A.

(57) ABSTRACT

A method includes retrieving a debtor payment voucher file from a third party repository of bankruptcy trustee data, such as the National Data Center, wherein the debtor payment voucher file comprises information regarding debtor payments to a bankruptcy trustee; identifying a first set of debtor payment transaction information contained within the debtor payment voucher file that can be associated with one or more bankruptcy accounts of a collection authority; identifying a second set of debtor payment transaction information contained within the debtor payment voucher file that cannot be associated with one or more bankruptcy accounts of the collection authority; and combining the first set of debtor payment transaction information into a batch file. General ledger account entries for debtor payment transaction information in the batch file are generated and these general ledger account entries are then posted to an accounting system.

16 Claims, 6 Drawing Sheets

```
TrusteeCode| TrusteeName| TrusteeCity| TrusteeState| CaseNumber| DeblLastName| Deb1FirstName| Deb1SSN| Deb2LastName| Deb2FirstName| Deb2SSN| CaseStatus| ClaimNumber| Ac
countNumber| ChkDate| CheckNo| CheckAmount| ClaimLevel| ClaimType| Comment| CreditNo| CreditName| PaymentType| case_pk| claim_pk| UCI LAUR| Timothy P. Branigan| Laurel| MD| 0617056| BARNES| CARL O| 220903099| BARNES| CAROL D| 577962230| Active|
Case| 0004| 3103| 2/29/2012| 0230918| 126.83| 33| UNSECURED| TRANSFER| 211781| PRA RECEIVABLES MANAGEMENT LLC| AMOUNT DISBURSED TO CREDITOR| 88007033| 117363873|

LAUR| Timothy P. Branigan| Laurel| MD| 0617056| BARNES| CARL O| 220903099| BARNES| CAROL D| 577962230| Active|
Case| 0011| 4185876| 50192377| 2/29/2012| 0230918| 26.43| 33| UNSECURED| RESURGENT TRANSF| 211781| PRA RECEIVABLES MANAGEMENT LLC| AMOUNT DISBURSED TO
CREDITOR| 88007033| 117367779||

LAUR| Timothy P. Branigan| Laurel| MD| 0617664| LANCASTER| LARRY C| 216762507| LANCASTER| KAREN M| 213808406| COMPLETED| 0018| 3827/CAPITAL
ONE| 2/29/2012| 0230918| 0.01| 33| UNSECURED| AMEND/DUP W/D-TRANSF| 211781| PRA RECEIVABLES MANAGEMENT LLC| AMOUNT DISBURSED TO
CREDITOR| 88007114| 117380214|

LAUR| Timothy P. Branigan| Laurel| MD| 0618103| JACKSON| CALVIN U| 578808426| JACKSON| DIANE L|
577789596| COMPLETED| 0004| 43TDM4207667174S| 2/29/2012| 0230918| 12.43| 33| UNSECURED| CAPITAL ONE/TRANSFER| 211781| PRA RECEIVABLES MANAGEMENT LLC| AMOUNT
DISBURSED TO CREDITOR| 88007159| 117384068||

LAUR| Timothy P. Branigan| Laurel| MD| 0618238| FRANCIS| TIMOTHY E| 577785219|| 000000000| COMPLETED| 0011| 8373| CAPITAL ONE
BAN| 2/29/2012| 0230918| 12.87| 33| UNSECURED| TRANSFER| 211781| PRA RECEIVABLES MANAGEMENT LLC| AMOUNT DISBURSED TO CREDITOR| 88007174| 117356156||

LAUR| Timothy P. Branigan| Laurel| MD| 0710170| TAYMAN| DAVID M| 212116571| TAYMAN| REBECCA S| 220082751| COMPLETED| 0005| 8117| CAPITAL
ONE| 2/29/2012| 0230918| 12.34| 15| UNSECURED| TRANSFER| 211781| PRA RECEIVABLES MANAGEMENT LLC| AMOUNT DISBURSED TO CREDITOR| 88007246| 117343611||

LAUR| Timothy P. Branigan| Laurel| MD| 0710170| TAYMAN| DAVID M| 212116571| TAYMAN| REBECCA S| 220082751| COMPLETED| 0005| 0466|
2/29/2012| 0230918| 8| 15| UNSECURED| CAPITAL ONE/TRANSFER| 211781| PRA RECEIVABLES MANAGEMENT LLC| AMOUNT DISBURSED TO CREDITOR| 88007246| 117385642||

LAUR| Timothy P. Branigan| Laurel| MD| 0710170| TAYMAN| DAVID M| 212116671| TAYMAN| REBECCA S| 220082751| COMPLETED| 0007| 5424130515793062|
2/29/2012| 0230918| 3.58| 15| UNSECURED| RESURGENT/TRANSFER| 211781| PRA RECEIVABLES MANAGEMENT LLC| AMOUNT DISBURSED TO CREDITOR| 88007246| 117356494||

LAUR| Timothy P. Branigan| Laurel| MD| 0710170| TAYMAN| DAVID M| 212116671| TAYMAN| REBECCA S| 220082751| COMPLETED| 0018| 5049941012465693|
2/29/2012| 0230918| 1.3| 15| UNSECURED| CITIBANK/TRANSFER| 211781| PRA RECEIVABLES MANAGEMENT LLC| AMOUNT DISBURSED TO CREDITOR| 88007246| 117385644||

LAUR| Timothy P. Branigan| Laurel| MD| 0710382| VEST| WAYNE R| 220194116|| | 000000000| COMPLETED| 0013| 2098-LVNV FUNDING|
2/29/2012| 0230918| 41.08| 33| UNSECURED| RESURGENT/TRANSFER| 211781| PRA RECEIVABLES MANAGEMENT LLC| AMOUNT DISBURSED TO CREDITOR| 88007272| 117384174||
```

FIG. 3

BATCH LIST

CHOOSE A BATCH TO OPEN

| BATCH | CREATED | PROCESSED | USER | STATUS | |
|---|---|---|---|---|---|
| OPEN | PAYMENT41221 | 6/30/2011 7:52:08 PM | 6/30/2011 8:15:32 PM | MLK | DOWNLOADED | HISTORY |
| OPEN | PAYMENT41220 | 6/30/2011 7:21:17 PM | | FMN | PENDING | HISTORY |
| OPEN | PAYMENT41219 | 6/30/2011 7:21:10 PM | 6/30/2011 8:24:54 PM | SJD | DOWNLOADED | HISTORY |
| OPEN | PAYMENT41218 | 6/30/2011 7:20:59 PM | 6/30/2011 8:07:57 PM | SJD | DOWNLOADED | HISTORY |
| OPEN | PAYMENT41217 | 6/30/2011 6:41:15 PM | 6/30/2011 6:51:00 PM | SJD | DOWNLOADED | HISTORY |
| OPEN | PAYMENT41216 | 6/30/2011 6:11:59 PM | 6/30/2011 6:16:32 PM | EGF | DOWNLOADED | HISTORY |
| OPEN | PAYMENT41216 | 6/30/2011 5:45:31 PM | 6/30/2011 8:18:30 PM | LGL5 | DOWNLOADED | HISTORY |
| OPEN | PAYMENT41214 | 6/30/2011 5:32:36 PM | 6/30/2011 5:35:19 PM | BCR | DOWNLOADED | HISTORY |
| OPEN | PAYMENT41213 | 6/30/2011 5:20:27 PM | 6/30/2011 5:30:39 PM | SJD | DOWNLOADED | HISTORY |

FIG. 4

EXTENDED VIEW  PAYM41221

<u>1</u> <u>2</u> <u>3</u> — 400

| | ACCOUNT# | TRAN CODE | TRAN DATE | REFERENCE # | GROSS AMOUNT | AGENCY FEE | LAST 3 DIGITS | |
|---|---|---|---|---|---|---|---|---|
| NOTICES:1 | 600889630168569 | PMT | 04/26/12 | 39784 | 106.06 | $0.00 | BBB | DELETE |
| NOTICES:1 | 00000000000970863029 | PMT | 04/26/12 | 39784 | 106.06 | $0.00 | BBB | DELETE |
| NOTICES:1 | 00000000000991519329 | PMT | 04/26/12 | 39784 | 106.06 | $0.00 | BBB | DELETE |
| NOTICES:1 | 00000000000991549529 | PMT | 04/26/12 | 39784 | 106.06 | $0.00 | BBB | DELETE |
| NOTICES:1 | 00000000000025512419 | PMT | 04/26/12 | 39784 | 106.06 | $0.00 | BBB | DELETE |
| NOTICES:1 | 00000000000002675639 | PMT | 04/26/12 | 39784 | 106.06 | $0.00 | BBB | DELETE |
| NOTICES:1 | 00000000000004231809 | PMT | 04/26/12 | 39784 | 106.06 | $0.00 | BBB | DELETE |
| NOTICES:1 | 00000000000970765929 | PMT | 04/26/12 | 39784 | 106.06 | $0.00 | BBB | DELETE |
| NOTICES:1 | 00000000000970821719 | PMT | 04/26/12 | 39784 | 106.06 | $0.00 | BBB | DELETE |
| NOTICES:1 | 00000000000981140649 | PMT | 04/26/12 | 39784 | 106.06 | $0.00 | BBB | DELETE |
| NOTICES:1 | 00000000000991579999 | PMT | 04/26/12 | 39784 | 106.06 | $0.00 | BBB | DELETE |
| NOTICES:1 | 00000000000991728239 | PMT | 04/26/12 | 39784 | 106.06 | $0.00 | BBB | DELETE |
| NOTICES:1 | 00000000000013896279 | PMT | 04/26/12 | 39784 | 106.06 | $0.00 | BBB | DELETE |
| NOTICES:1 | 00000000000548669 | PMT | 04/26/12 | 39784 | 106.06 | $0.00 | BBB | DELETE |
| NOTICES:1 | 00000000008506433499 | PMT | 04/26/12 | 39784 | 106.06 | $0.00 | BBB | DELETE |
| NOTICES:1 | 00000000082887089 | PMT | 04/26/12 | 39784 | 106.06 | $0.00 | BBB | DELETE |

FIG. 5

SYSTEMS, METHODS AND COMPUTER PROGRAM PRODUCTS THAT FACILITATE MATCHING OF DEBTOR PAYMENTS TO COLLECTION AUTHORITY ACCOUNTS

FIELD OF THE INVENTION

The present invention relates generally to financial obligations and, more particularly, to collection of financial obligations.

BACKGROUND

Individuals are under unprecedented financial pressure as the economic downturn continues. Many people are deeply in debt and struggling to keep up with their monthly financial obligations. Unmanageable debt loads, delinquencies, foreclosures and bankruptcies are becoming common. However, unpaid consumer debts affect everyone. Unmet financial obligations raise the cost of doing business and are passed through to members of society in the form of higher prices for goods and services, higher taxes, and higher banking and finance charges. As such, resolving unpaid consumer debt and facilitating repayment is considered important in restoring the financial health of consumers and in helping businesses weather difficult economic times.

Collection authorities and the debt collection process are vital to a credit economy by recovering amounts owed to lenders and enabling them to continue lending. Some collection authorities acquire the portfolios of charged-off debt and debt of consumers in bankruptcy, as well as other types of debt, at a discount and seek to collect a multiple of the purchase price over the economic life of a portfolio. Exemplary types of debt in such portfolios may include Chapter 11 debt, Chapter 12 debt, Chapter 13 debt, secured and unsecured bankruptcy debt, dismissed bankruptcy cases, threatened bankruptcy debt, credit card debt, installment loans, lines of credit, secured automobile and automobile deficiencies, medical debt, retail debt, telecom debt, utilities debt, and the like.

In a typical bankruptcy proceeding, there may be several creditors involved with a single debtor. Each creditor may file one or more claims against the debtor. The bankruptcy court appoints a trustee to manage the claims against the debtor. The trustee collects payments from the debtor and distributes the payments to the creditors in order to satisfy the claims against a loan(s), according to the bankruptcy plan confirmed by the bankruptcy court.

A collection authority generally maintains an electronic file for a loan or debtor that is in active bankruptcy. The file includes data related to the loan and the corresponding claims as defined in a proof of claim (POC). For example, the file typically includes the loan number, the borrower's name, the borrower's social security number, the bankruptcy case number, and the trustee name, among other types of information. A collection authority typically receives trustee data relating to claims and loans that are in the loan servicer's portfolio from a database of the National Data Center (NDC). As known to those skilled in the art, the NDC is a repository of bankruptcy trustee data. The NDC has agreements with the majority of the bankruptcy trustees in the United States. The NDC receives updates from bankruptcy trustees with data related to each of the debtors over whom they have jurisdiction for the collection and distribution of the debtor funds.

Unfortunately, a collection authority, upon receiving trustee data from the NDC, typically is required to undergo a time consuming and tedious process to determine which accounts have received a payment from a debtor. For example, when an NDC voucher file is received by a collection authority, the collection authority has to match debtor payment transactions to the collection authority's account. The person performing this task then has to copy payment data that was matched to a collection authority's account into another system so that those payments can be posted into various accounting and financial systems.

SUMMARY

It should be appreciated that this Summary is provided to introduce a selection of concepts in a simplified form, the concepts being further described below in the Detailed Description. This Summary is not intended to identify key, features or essential features of this disclosure, nor is it intended to limit the scope of the invention.

According to some embodiments of the present invention, a method of facilitating the matching of debtor payments to collection authority accounts includes retrieving a debtor payment voucher file from a third party repository of bankruptcy trustee data, such as the National Data Center, wherein the debtor payment voucher file comprises information regarding debtor payments to a bankruptcy trustee; identifying a first set of debtor payment transaction information contained within the debtor payment voucher file that can be associated with one or more bankruptcy accounts of a collection authority; identifying a second set of debtor payment transaction information contained within the debtor payment voucher file that cannot be associated with one or more bankruptcy accounts of the collection authority; and combining the first set of debtor payment transaction information into a batch file. The step of identifying a first set of debtor payment transaction information contained within the debtor payment voucher file that can be associated with one or more bankruptcy accounts of a collection authority includes identifying each individual payment made by a debtor associated with the one or more bankruptcy accounts of the collection authority. For the second set of debtor payment transaction information, a bankruptcy account of the collection authority that should be associated with the second set of debtor payment transaction information is determined, and the second set of debtor payment transaction information is appended to the batch file. General ledger account entries for debtor payment transaction information in the batch file are generated and these general ledger account entries are then posted to an accounting system. In some embodiments of the present invention, retrieving a debtor payment voucher file from a third party repository of bankruptcy trustee data is in response to receipt of a notification from the third party.

According to some embodiments of the present invention, a system of facilitating the matching of debtor payments to collection authority accounts includes at least one processor configured to retrieve a debtor payment voucher file from a third party repository of bankruptcy trustee data, such as the National Data Center, wherein the debtor payment voucher file comprises information regarding debtor payments to a bankruptcy trustee; identify a first set of debtor, payment transaction information contained within the debtor payment voucher file that can be associated with one or more bankruptcy accounts of a collection authority; identify a second set of debtor payment transaction information contained within the debtor payment voucher file that cannot be associated with one or more bankruptcy accounts of the collection authority; and combine the first set of debtor payment transaction information into a batch file. In some embodiments of the present invention, the at least one processor is configured to determine a bankruptcy account of the collection authority that should be associated with the second set of debtor payment transaction information; and append the second set of debtor payment transaction information into the batch file. In some embodiments of the present invention, the at least one processor is configured to generate general ledger account entries for debtor payment transaction information in the batch file and posting the general ledger account entries to an accounting system. In some embodiments of the present invention, the at least one processor is configured to retrieve a debtor payment voucher file from a third party repository of bankruptcy trustee data in response to receipt of a notification from the third party.

It is noted that aspects of the invention described with respect to one embodiment may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail below.

BRIEF DESCRIPTION OF THE DRAWINGS

The accompanying drawings, which form a part of the specification, illustrate various embodiments of the present invention. The drawings and description together serve to fully explain embodiments of the present invention.

FIG. 3 illustrates an exemplary NDC debtor payment voucher file.

FIG. 4 illustrates a list of batch files of debtor payments, according to some embodiments of the present invention.

FIG. 5 illustrates an individual batch file selected from the list of FIG. 4.

DETAILED DESCRIPTION

Figure 1:
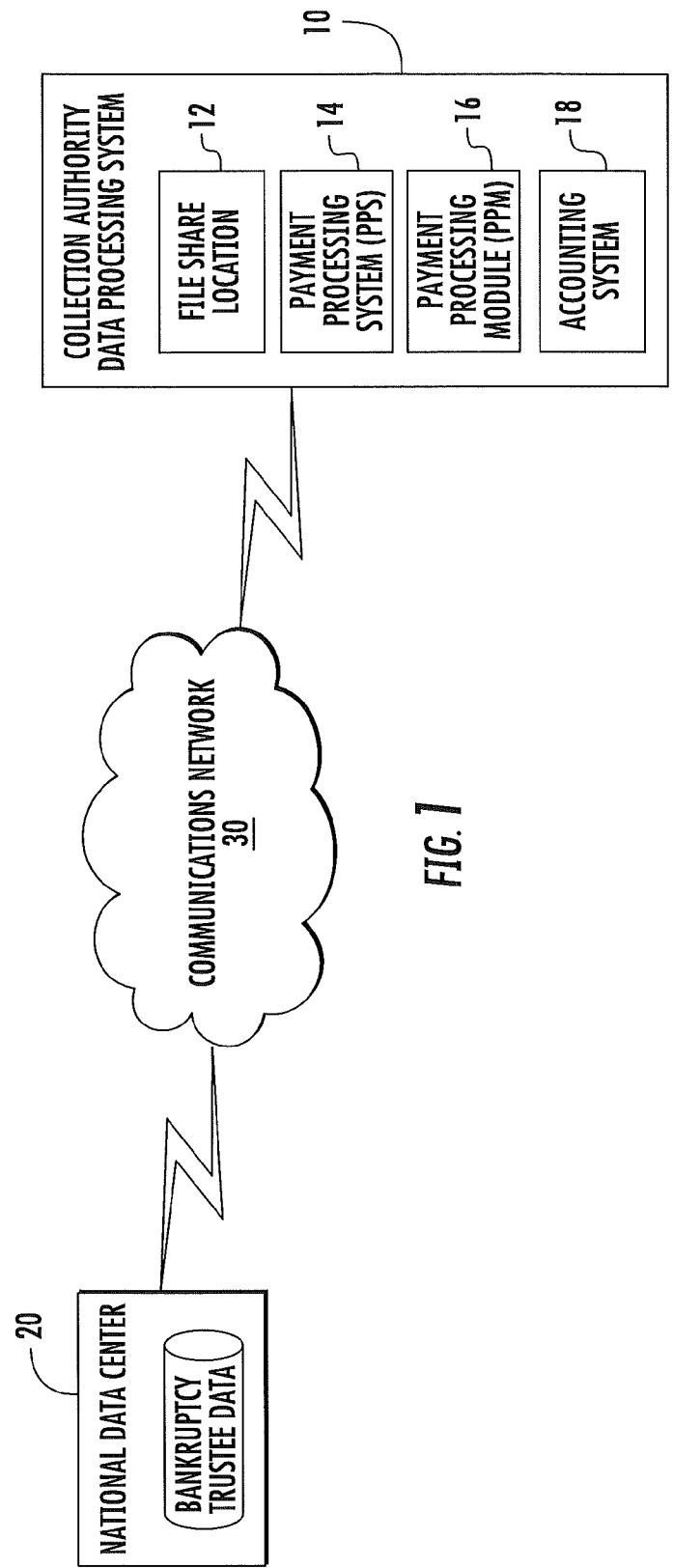
FIG. 1 is a block diagram that illustrates systems, methods, and computer program products, according to some embodiments of the present invention, that facilitate matching of debtor payments to debt collection accounts.

The present invention will now be described more fully hereinafter with reference to the accompanying figures, in which embodiments of the invention are shown. This invention may, however, be embodied in many different forms and should not be construed as limited to the embodiments set forth herein. Like numbers refer to like elements throughout. In the figures, certain components or features may be exaggerated for clarity. In addition, the sequence of operations (or steps) is not limited to the order presented in the claims unless specifically indicated otherwise. Although described or shown with respect to one embodiment and/or figure, the features and elements so described or shown can apply to other embodiments and/or figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

It will be understood that although the terms first and second are used herein to describe various features or elements, these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

The terms "data processing system", "processor", and "at least one processor", as used herein, are interchangeable.

Exemplary embodiments of the present invention may be embodied as methods, systems, and/or computer program products. Accordingly, exemplary embodiments of the present invention may be embodied in hardware and/or in software (including firmware, resident software, micro-code, etc.). Furthermore, exemplary embodiments of the present invention may take the form of a computer program product comprising a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, or device. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Some aspects of the present invention may be implemented in a "cloud" computing environment. Cloud computing is a computing paradigm where shared resources, such as processor(s), software, and information, are provided to computers and other devices on demand typically over a network, such as the Internet. In a cloud computing environment, details of the computing infrastructure, e.g., processing power, data storage, bandwidth, and/or other resources are abstracted from the user. The user does not need to have any expertise in or control over such computing infrastructure resources. Cloud computing typically involves the provision of dynamically scalable and/or virtualized resources over the Internet. A user may access and use such resources through the use of a Web browser. A typical cloud computing provider may provide an online application that can be accessed over the Internet using a browser. The cloud computing provider, however, maintains the software for the application and some or all of the data associated with the application on servers in the cloud, i.e., servers that are maintained by the cloud computing provider rather than the users of the application.

Exemplary embodiments of the present invention are described herein with reference to flowchart and/or block diagram illustrations. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means and/or circuits for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Referring now to the figures, various methods, systems and computer program products that facilitate a collection authority automatically matching information in NDC debtor payment voucher files with the collection authority's own accounts, according to embodiments of the present invention, will be described. A collection authority data processing system 10 (FIG. 1) includes the following modules/systems that are linked together: a File Share Location 12, a Payment Processing System (PPS) 14, a Payment Processing Module (PPM) 16, and an Accounting System 18. The PPS 14 manages the processing, reporting, and analysis of check payments made by debtors in bankruptcy proceedings. The PPS 14 gathers, processes, reconciles, and updates checks in the system as well as generates necessary files used to complete the reconciliation process. Specifically, the PPS 14 is configured to pick up NDC voucher files, match them to a collection authority account, and then batch them so they can be uploaded into the PPM 16. From the PPM 16, the debtor payments get posted to various accounting systems.

Figure 2:
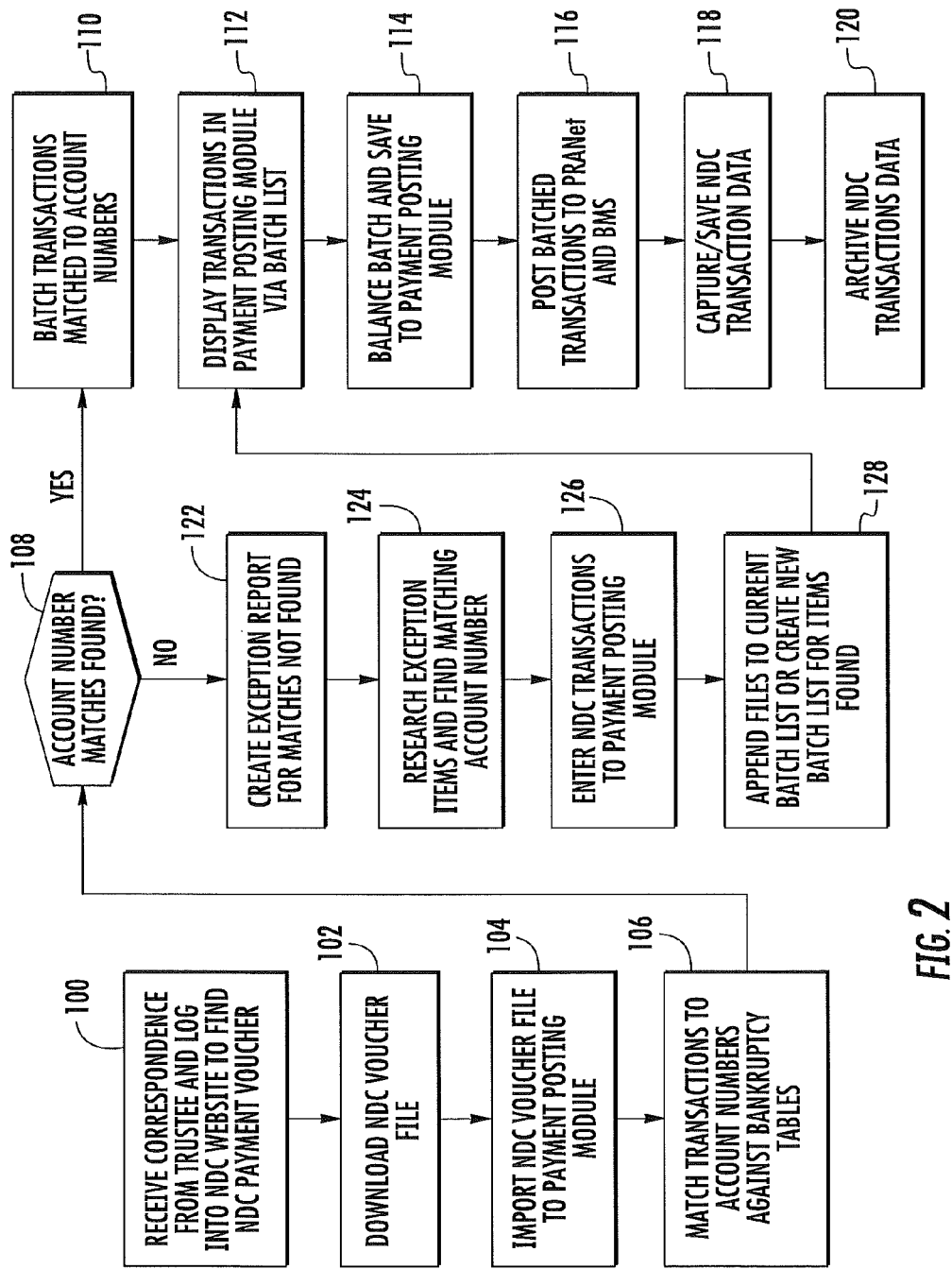
FIG. 2 is a flow chart of operations for facilitating the matching of debtor payments to debt collection accounts, according to some embodiments of the present invention.

Embodiments of the present invention allow for direct importing of NDC debtor payment voucher files to the PPM 14, which will reduce errors and give users the ability to post more financial transactions quickly with fewer resources. Referring to FIG. 2, a collection authority employee (hereinafter referred to as a "user") receives correspondence (e.g., mail, e-mail, facsimile transmission, etc.) from a bankruptcy trustee regarding case settlement/payment information (Block 100). The correspondence typically includes, among other information, a bankruptcy case number, bankruptcy trustee name, and check number(s) of the payment(s) received from a debtor. Such correspondence may be received at various time intervals such as, but not limited to, weekly, daily, hourly, etc. However, embodiments of the present invention are not limited to any particular time interval for receiving correspondence. For example, such correspondence may be received intermittently.

In response to receiving correspondence (Block 100), the user navigates to and logs on to a website 20 (FIG. 1) of the NDC to find a debtor payment voucher file associated with received correspondence, and then downloads the located payment voucher file to a designated file share location 12 within a data processing system 10 of the collection authority (Block 102). Typically, a debtor payment voucher file is saved in a folder within the file share location 12 by a username and or other identification (ID) of the user downloading the voucher file from the NDC website 20. However, debtor payment voucher files may be saved in folders using various descriptions and/or identifiers without limitation.

An NDC debtor payment voucher file is typically a text file (i.e., a ".txt" file); however, other file types are possible. An exemplary NDC debtor payment voucher file 200 is illustrated in FIG. 3. The illustrated NDC voucher file 200 contains payment transactions that a collection authority receives through a trustee. The illustrated NDC debtor payment voucher file 200 contains various fields pertaining to the trustee, the debtor(s), debtor(s) identification information, bankruptcy case identification information, debtor payment identification information, etc. Specifically, the illustrated NDC debtor payment voucher file 200 includes the following fields: TrusteeCode 202, TrusteeName 204, TrusteeCity 206, TrusteeState 208, CaseNumber 210, Deb1LastName 212, Deb1FirstName 214, Deb1SSN, 216, Deb2LastName 218, Deb2FirstName 220, Deb2SSN 222, CaseStatus 224, ClaimNumber 226, AccountNumber 228, ChkDate 230, CheckNo 232, CheckAmount 234, ClaimLevel 236, ClaimTyoe 238, Comment 240, CredNo 242, CredName 244, PaymentType 246, case_pk 248, claim_pk 250, UCI 252. Information is included within these respective fields of the NDC debtor payment voucher file 200 for payments made by numerous debtors in one or more bankruptcy cases.

Subsequently, the PPM 16 goes out to the shared location 12 and retrieves one or more NDC debtor payment voucher files 200 contained therein that have been downloaded from the NDC website 20. The PPM 16 runs a query against existing bankruptcy tables maintained by the collection authority to match debtor payment transactions with account numbers of the collection authority (Block 106), typically using, for example, information such as social security numbers, case numbers, account numbers, balances and claim amount. If collection authority account number matches are found for a particular NDC debtor payment voucher file (Block 108), the PPM 16 will batch NDC files found with matching account numbers (Block 110) and display them in a batch list user interface 300, as illustrated in FIG. 4 (Block 112).

The PPM 16 "batches", i.e., lists all of the debtor payments in an NDC voucher file that have been matched to an account of the collection authority. Note, that there can be multiple debtor payments to one collection authority account. In FIG. 4, multiple debtor payments are listed or "batched" together in respective batch files in the displayed user interface 300. The batch list includes an identification of a respective batch file of debtor payments in the "Batch" column 302. For example "PAYM41221" refers to a specific batch file of debtor payments. The other columns in FIG. 4 provide various information about each respective batch file. For example column 304 entitled "Created" provides information about when a respective batch file was created, column 306 entitled "Processed" provides information about when a respective batch file was processed, column 308 entitled "User" identifies the user who created a respective batch file, and column 310 entitled "Status" provides information about the status of a respective batch file. In column 312, a GUI control entitled "History" is provided that, in response to user activation (e.g., via a mouse click, touching or tapping via a finger or stylus, etc.) displays the history of a respective batch file. In column 314, a GUI control entitled "Open" is provided that, in response to user activation (e.g., via a mouse click, touching or tapping via a finger or stylus, etc.) displays all of the debtor payments associated with the batch file.

Referring to FIG. 5, a user interface 400 is illustrated that displays a list of debtor payments associated with a respective batch file in FIG. 4, upon selection of the batch file in the user interface 300 of FIG. 4 via GUI control 314. Specifically, batch file "PAYM41221" from FIG. 4 has been selected and the user interface 400 displays debtor payments associated with respective accounts of the collection authority.

In the illustrated NDC debtor payment voucher file 200 (FIG. 3), the PPM 16 will look at the TrusteeCode 202, CaseNumber 210, and ClaimNumber 226 fields and match them against a voucher match table on an Accounting system server to find a matching collection authority account number that can then be posted to a batch file in the PPM 16. In addition, periodically (e.g., each day, etc.) a reconciliation report/file containing all of the PPM batch files produced will be stored. This reconciliation report will include the current status of the PPM batch files and all the relevant details. Exemplary current status of batch files may include "downloaded" and "deleted," meaning that, once the payment is downloaded into the various accounting systems, it is typically deleted from the PPM 16, which indicates the final posting to the various accounting systems is complete. Batch files with a status of "Downloaded" but not marked as deleted can assume that a payment transaction was posted. The assumption is that all NDC debtor payment voucher files created for the day will be processed/verified prior to the reconciliation process running.

Returning to FIG. 2, if account number matches are not found (Block 108), the PPM 16 will produce an exceptions report for NDC debtor payment voucher files that cannot be matched to a bankruptcy account number of the collection authority (Block 122). Any debtor payment transactions not found are considered "unallocated" and will be placed by the PPM 16 in an "Exceptions" report and transmitted (e.g., emailed or otherwise transmitted) to the user for manual research. A user will then review the NDC debtor payment voucher files that need bankruptcy account numbers of the collection authority and locate matching account numbers (Block 124). After the user finds the account numbers for the "unallocated" items in the exception report, he/she will enter the NDC debtor payment transactions to the PPM (Block 126) and append the NDC debtor payment voucher file data to the batch list (i.e., the user logs into the PPM 16 and manually enter the payments from the NDC voucher file) or create a new batch list for the items found (i.e., the user can fix the data in the exception report and rerun it through the NDC voucher process) (Block 128). Essentially, the exceptions report is a listing of the payments that could not be matched to a collection authority's account. It is in the same format as the original voucher file, which can be reimported through the process. The PPM appends the manually matched debtor payment transactions to the current Batch list and displays them in PPM (Block 112).

The user then balances the batch and saves the entries to PPM (Block 114). This means that the user has to make sure that the total dollar amount of the payments posted in PPM 16 matches what was received in the NDC voucher file. The user can go into the PPM 16 and make corrections. The data consisting of the imported NDC voucher files matched against the bankruptcy tables for an account number (with payment information) is also saved so it can be archived and/or moved to a data warehouse. This should include those accounts matched manually from the exceptions report. The batched transactions are posted for download to charge off accounts (PRANet) and bankruptcy accounts (BMS) and ultimately to general ledger and accounting systems (Block 116). For example, general ledger account entries are generated for debtor payment transaction information in the batch file and these general ledger account entries are then posted to an accounting system.

Data regarding NDC debtor payment transactions are then captured and saved (Block 118). The PPM 16 gathers the saved data (e.g., data from the imported NDC debtor payment voucher files matched against the collection authority's bankruptcy tables for account number) for archive and/or moved to a data warehouse. Users need to be able to match a previously posted payment to the NDC debtor payment voucher file that was originally used to post it (if needed in the future). The PPM 16 archives the data and/or moves it to a data warehouse (Block 120).

Figure 6:
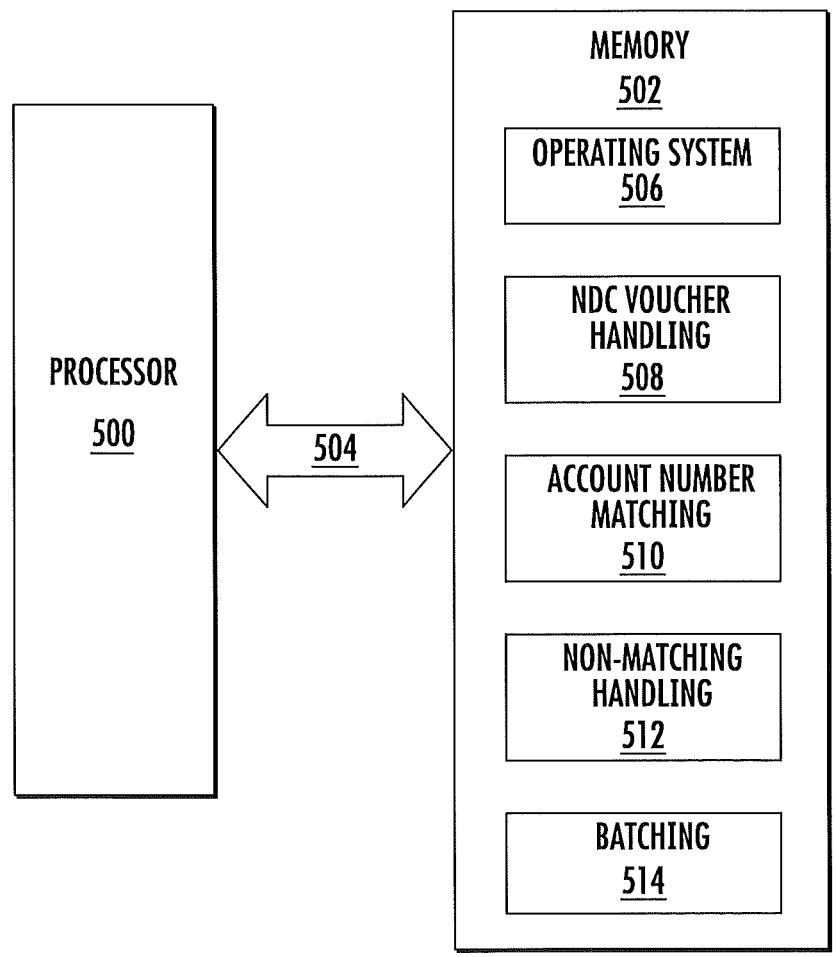
FIG. 6 is a block diagram that illustrates details of an exemplary processor and memory that may be used to implement various functions of a data processing system that facilitates matching of debtor payments to debt collection accounts, according to some embodiments of the present invention.

FIG. 6 illustrates an exemplary processor 500 and memory 502 of a data processing system that may be used to implement the functions of data processing system 10 and the various operations of FIG. 2, according to some embodiments of the present invention. The processor 500 communicates with the memory 502 via an address/data bus 504. The processor 500 may be, for example, a commercially available or custom microprocessor. The memory 502 is representative of the overall hierarchy of memory devices containing the software and data used to implement various functions of the data processing system 10 (FIG. 1) as described herein. The memory 502 may include, but is not limited to, the following types of devices: cache, ROM, PROM, EPROM, EEPROM, flash, SRAM, and DRAM.

As shown in FIG. 6, the memory 502 may hold various categories of software and data: an operating system 506, an NDC voucher handling module 508, an account number matching module 510, a non-matching handling module 512, and a batching module 514. The operating system 506 controls operations of one or more data processors that implement the data processing system 10 (FIG. 1). In particular, the operating system 506 may manage the resources of the data processing system 10 and may coordinate execution of various programs (e.g., NDC voucher handling module 508, account number matching module 510, non-matching handling module 512, batching module 514, etc.) by the processor 500.

The NDC voucher handling module 508 comprises logic for downloading and storing NDC voucher files. The account number matching module 510 comprises logic for matching account numbers within NDC voucher files with bankruptcy tables of a collection authority. The non-matching handling module 512 comprises logic for creating exception reports for account numbers within NDC voucher files that do not match the bankruptcy tables of a collection authority, and entering non-matching NDC transaction in the Payment Posting Module. The batching module 514 comprises logic for batching transactions matched to account numbers.

Computer program code for carrying out operations of processor 500 discussed herein may be written in a high-level programming language, such as Python, Java, AJAX (Asynchronous JavaScript), C, and/or C++, for development convenience. In addition, computer program code for carrying out operations of exemplary embodiments of the present invention may also be written in other programming languages, such as, but not limited to, interpreted languages. Some modules may be written in assembly language or even micro-code to enhance performance and/or memory usage. However, embodiments of the present invention are not limited to a particular programming language. It will be further appreciated that the functionality of any or all of the program modules may also be implemented using discrete hardware components, one or more application specific integrated circuits (ASICs), or a programmed digital signal processor or microcontroller.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A method of facilitating the matching of debtor payments to collection authority accounts, comprising:
    retrieving a debtor payment voucher file from a third party repository of bankruptcy trustee data, wherein the debtor payment voucher file comprises information regarding debtor payments to a bankruptcy trustee;
    identifying a first set of debtor payment transaction information contained within the debtor payment voucher file that can be associated with one or more bankruptcy accounts of a collection authority;
    identifying a second set of debtor payment transaction information contained within the debtor payment voucher file that cannot be associated with one or more bankruptcy accounts of the collection authority;
    combining the first set of debtor payment transaction information into a batch file;
    determining a bankruptcy account of the collection authority that should be associated with the second set of debtor payment transaction information; and
    appending the second set of debtor payment transaction information into the batch file,
    wherein at least one of receiving a debtor payment voucher file, identifying a first set of debtor payment transaction information, identifying a second set of debtor payment transaction information, combining the first set of debtor payment transaction information into a batch file, determining a bankruptcy account, and appending the second set of debtor payment transaction information is performed using at least one processor.

2. The method of claim 1, wherein retrieving a debtor payment voucher file from a third party repository of bankruptcy trustee data is in response to receipt of a notification from the third party.

3. The method of claim 1, wherein the third party is the National Data Center.

4. The method of claim 1, wherein identifying a first set of debtor payment transaction information contained within the debtor payment voucher file that can be associated with one or more bankruptcy accounts of a collection authority comprises identifying each individual payment made by a debtor associated with the one or more bankruptcy accounts of the collection authority.

5. The system of claim 1, wherein the third party is the National Data Center.

6. A method of facilitating the matching of debtor payments to collection authority accounts, comprising:
    retrieving a debtor payment voucher file from a third party repository of bankruptcy trustee data, wherein the debtor payment voucher file comprises information regarding debtor payments to a bankruptcy trustee;
    identifying a first set of debtor payment transaction information contained within the debtor payment voucher file that can be associated with one or more bankruptcy accounts of a collection authority;
    identifying a second set of debtor payment transaction information contained within the debtor payment voucher file that cannot be associated with one or more bankruptcy accounts of the collection authority;
    combining the first set of debtor payment transaction information into a batch file;
    determining a bankruptcy account of the collection authority that should be associated with the second set of debtor payment transaction information;
    appending the second set of debtor payment transaction information to the batch file; and
    generating general ledger account entries for debtor payment transaction information in the batch file and posting the general ledger account entries to an accounting system,
    wherein at least one of receiving a debtor payment voucher file, identifying a first set of debtor payment transaction information, identifying a second set of debtor payment transaction information, combining the first set of debtor payment transaction information, determining a bankruptcy account of the collection authority that should be associated with the second set of debtor payment transaction information, appending the second set of debtor payment transaction information to the batch file is performed using at least one processor, and generating general ledger account entries for debtor payment transaction information in the batch file and posting the general ledger account entries to an accounting system is performed by at least one processor.

7. The method of claim 6, wherein retrieving a debtor payment voucher file from a third party repository of bankruptcy trustee data is in response to receipt of a notification from the third party.

8. The method of claim 6, wherein the third party is the National Data Center.

9. The method of claim 6, wherein identifying a first set of debtor payment transaction information contained within the debtor payment voucher file that can be associated with one or more bankruptcy accounts of a collection authority comprises identifying each individual payment made by a debtor associated with the one or more bankruptcy accounts of the collection authority.

10. A system of facilitating the matching of debtor payments to collection authority accounts, comprising at least one processor configured to:
   retrieve a debtor payment voucher file from a third party repository of bankruptcy trustee data, wherein the debtor payment voucher file comprises information regarding debtor payments to a bankruptcy trustee;
   identify a first set of debtor payment transaction information contained within the debtor payment voucher file that can be associated with one or more bankruptcy accounts of a collection authority;
   identify a second set of debtor payment transaction information contained within the debtor payment voucher file that cannot be associated with one or more bankruptcy accounts of the collection authority;
   combine the first set of debtor payment transaction information into a batch file;
   determine a bankruptcy account of the collection authority that should be associated with the second set of debtor payment transaction information; and
   append the second set of debtor payment transaction information into the batch file.

11. The system of claim 10, wherein the at least one processor is configured to retrieve a debtor payment voucher file from a third party repository of bankruptcy trustee data in response to receipt of a notification from the third party.

12. A system of facilitating the matching of debtor payments to collection authority accounts, comprising at least one processor configured to:
   retrieve a debtor payment voucher file from a third party repository of bankruptcy trustee data, wherein the debtor payment voucher file comprises information regarding debtor payments to a bankruptcy trustee;
   identify a first set of debtor payment transaction information contained within the debtor payment voucher file that can be associated with one or more bankruptcy accounts of a collection authority;
   identify a second set of debtor payment transaction information contained within the debtor payment voucher file that cannot be associated with one or more bankruptcy accounts of the collection authority;
   combine the first set of debtor payment transaction information into a batch file;
   determine a bankruptcy account of the collection authority that should be associated with the second set of debtor payment transaction information;
   append the second set of debtor payment transaction information to the batch file; and
   generate general ledger account entries for debtor payment transaction information in the batch file and posting the general ledger account entries to an accounting system.

13. The system of claim 12, wherein the at least one processor is configured to retrieve a debtor payment voucher file from a third party repository of bankruptcy trustee data in response to receipt of a notification from the third party.

14. The system of claim 12, wherein the third party is the National Data Center.

15. A computer program comprising a non-transitory computer readable storage medium having encoded thereon instructions that, when executed on a processor, cause the processor to perform operations comprising:
   retrieving a debtor payment voucher file from a third party repository of bankruptcy trustee data, wherein the debtor payment voucher file comprises information regarding debtor payments to a bankruptcy trustee;
   identifying a first set of debtor payment transaction information contained within the debtor payment voucher file that can be associated with one or more bankruptcy accounts of a collection authority;
   identifying a second set of debtor payment transaction information contained within the debtor payment voucher file that cannot be associated with one or more bankruptcy accounts of the collection authority;
   combining the first set of debtor payment transaction information into a batch file;
   determining a bankruptcy account of the collection authority that should be associated with the second set of debtor payment transaction information; and
   appending the second set of debtor payment transaction information into the batch file.

16. A computer program comprising a non-transitory computer readable storage medium having encoded thereon instructions that, when executed on a processor, cause the processor to perform operations comprising:
   retrieving a debtor payment voucher file from a third party repository of bankruptcy trustee data, wherein the debtor payment voucher file comprises information regarding debtor payments to a bankruptcy trustee;
   identifying a first set of debtor payment transaction information contained within the debtor payment voucher file that can be associated with one or more bankruptcy accounts of a collection authority;
   identifying a second set of debtor payment transaction information contained within the debtor payment voucher file that cannot be associated with one or more bankruptcy accounts of the collection authority;
   combining the first set of debtor payment transaction information into a batch file;
   determining a bankruptcy account of the collection authority that should be associated with the second set of debtor payment transaction information;
   appending the second set of debtor payment transaction information to the batch file; and
   generating general ledger account entries for debtor payment transaction information in the batch file and posting the general ledger account entries to an accounting system.

* * * * *